Dec. 29, 1964   J. W. RIECK   3,163,281
METHOD AND APPARATUS FOR HANDLING ARTICLES
Filed Aug. 21, 1961   7 Sheets-Sheet 1

INVENTOR
J. W. RIECK
BY
ATTORNEY

INVENTOR
J. W. RIECK
BY
ATTORNEY

Dec. 29, 1964   J. W. RIECK   3,163,281
METHOD AND APPARATUS FOR HANDLING ARTICLES
Filed Aug. 21, 1961                               7 Sheets-Sheet 7

INVENTOR
J. W. RIECK
BY
ATTORNEY

United States Patent Office 3,163,281
Patented Dec. 29, 1964

3,163,281
METHOD AND APPARATUS FOR HANDLING ARTICLES
John W. Rieck, Indianapolis, Ind., assignor to Western Electric Company, Incorporated, a corporation of New York
Filed Aug. 21, 1961, Ser. No. 132,874
7 Claims. (Cl. 198—33)

This invention relates to a method and apparatus for handling articles, and in particular to a method and apparatus for locating articles in a predetermined position and angular orientation in preparation for the performance of one or more operations thereon. It is an object of the invention to provide an improved method and apparatus of such character.

In accordance with the preferred embodiment of the invention, articles of substantially duplicate form are fed in succession and at a predetermined position to apparatus which constitutes one feature of the present invention. A novel method and apparatus are provided for conveying the articles in succession from the predetermined position to successive work stations, these work stations preferably being spaced at equal distances such that the conveying apparatus may more readily advance the articles intermittently and simultaneously to next successive work stations. While the articles are fed to the apparatus in succession and at a predetermined position in space, the articles may be identifiable as to their angular orientation only by characteristics which are not readily detected by the external supply system. More particularly, the articles may, for example, comprise circular discs such as gears and be identifiable as to their angular orientation only by a characteristic such as a central rectangular slot. Another off-center opening or other indicia may, by its relationship with the central slot, identify one side of the disc with respect to the other, whereby the discs may be delivered to the apparatus right-side-up or up-side-down.

The method and apparatus of the present invention provide not only for movement of the successive articles to successive work stations, but for angularly orienting the articles to a predetermined relationship with respect to a work station. This may be accomplished in accordance with the present invention even though the articles are delivered in both right-side-up and up-side-down orientation.

In accordance with the preferred embodiment of the apparatus, means are provided for detecting and indicating completion of certain operations at the various work stations, in accordance with which indications successive operation of the apparatus may readily be controlled.

Accordingly, it is another object of the invention to provide an improved method and apparatus for intermittently advancing a succession of like articles simultaneously to respective ones of successive stations.

It is a further object of the invention to provide an improved method and apparatus for angularly orienting like articles such that an internal characteristic of the successive articles is brought to a desired angular orientation.

It is a still further object of the invention to provide an improved method and apparatus for angularly orienting like articles such that an eccentric aperture or recess in each article is brought to a desired angular orientation.

Another object of the invention is to provide an improved method and apparatus for interrupting the operation of a machine in the event that articles to be angularly oriented by such a machine are not properly oriented.

A further object of the invention is to provide an improved method and apparatus for inserting a pin in an aperture of successive articles.

A still further obejct of the invention is to provide an improved method and apparatus having various of the characteristics indicated above, either singly or in various combinations, while being inherently reliable in operation and inexpensive to manufacture.

Other objects and advantages of the invention will become apparent by reference to the following detailed description thereof and the accompanying drawings, in which.

Figure 6:
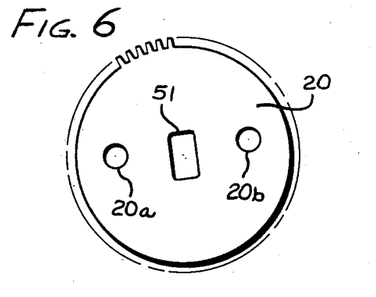
FIG. 6 is a plan view of a gear comprising a modification of the gear of FIG. 1 in that two apertures are provided.
Figure 7:
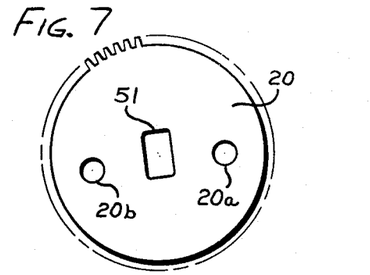
FIG. 7 is a view similar to FIG. 6 but showing the gear rotated through an angle of 180°.

The specific embodiment of the invention illustrated in the drawings is designed to handle gears 20 illustrated in FIGS. 6 and 7. These gears may be fed along a track 21 (seen in FIG. 9) to a magazine 22 wherein the gears form a vertical stack. The gears may be placed in the magazine 22 manually or they may be fed along the track 21 by any suitable automatic means such as a vibratory hopper, not shown in the drawings. The lowermost gear 20 in the magazine 22 normally rests upon a fixed platform or bed 25, which extends from the magazine 22 to the right in FIGS. 8, 9 and 10.

Conveyor apparatus is provided for moving successive gears 20 intermittently along the platform 25, the gears being permitted to pause momentarily at three operating stations generally designated A, B and C in FIGS. 8–12. This conveyor apparatus includes a forked slide member 31 (see FIGS. 10 and 13), having a yoke portion 31a at its left end and being slidable within slots formed by guide members 32 in cooperation with a base 33. The yoke 31a of the forked slide member 31 is connected in any desired manner to a shaft 35 (see FIG. 8) which is operated by a suitable pneumatic drive mechanism 36 to cause reciprocating sliding movement of the forked member 31.

Figure 10:
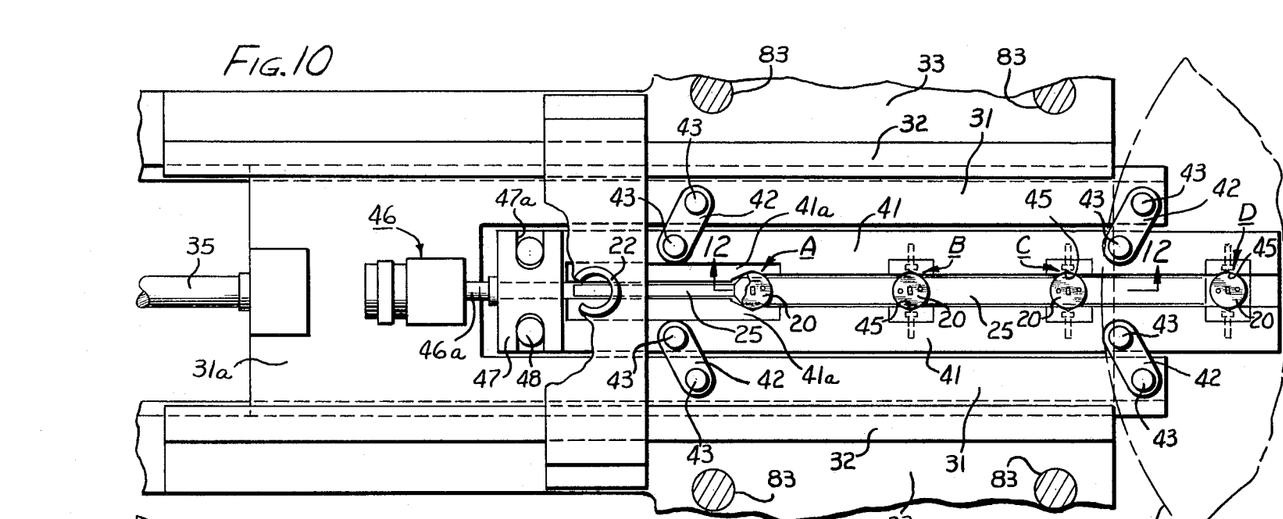
FIG. 10 is a cross-sectional view taken along the line 10—10 of FIG. 8.
Figure 13:
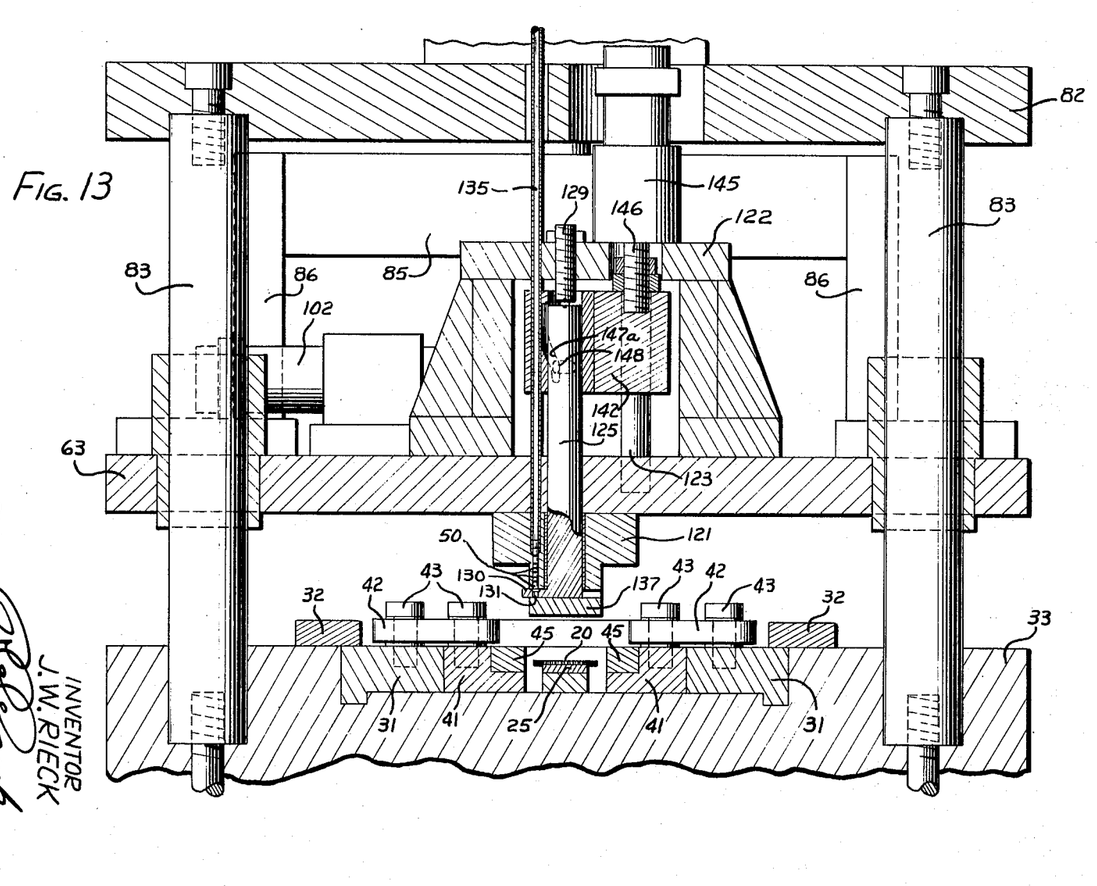
FIG. 13 is an enlarged partial, cross-sectional view taken along the line 13—13 of FIG. 9.

A pair of gear gripping members 41 are connected to respective arms of the forked member 31 through parallel linkage means including links 42 and suitable pivot pins 43. Each gear gripping member 41 is provided with four recessed jaws 45 suitably secured within recesses along one edge thereof. It will be apparent that the four pairs of opposed jaws 45 may receive four gears 20 when the members 41 swing toward each other as permitted by the links 42. Alternatively, the members 41 may swing away from each other such that they no longer engage the gears 20 on the platform 25. The jaws 45 are preferably of nylon or other durable but soft material in order to avoid damage to the gears 20.

Movement of the gear gripping members 41 with respect to the forked sliding member 31, and hence gripping of the gears 20 by the members 41, is controlled by a pneumatic drive mechanism 46 mounted on the yoke 31a of the forked sliding member 31. This mechanism drives a shaft 46a and a yoke 47 having a pair of slots 47a which receive rollers 48 rotatably mounted on respective ones of the members 41, all as best seen in FIG. 10. It may now be seen that when the pneumatic drive mechanism 46 drives the yoke 47 to the right, the members 41 will be driven to the right with respect to the forked slide member 31 such that they may engage four gears 20 between the four pairs of jaws 45. Conversely when the pneumatic drive mechanism 46 draws the yoke 47 to the left, the members 41 will be moved to the left with respect to the forked sliding member 31 such that they are retracted from the gears 20.

The pneumatic drive mechanism 46 is made to operate in timed sequence with the pneumatic drive mechanism 36 such that as the slide member 31 is moved to its extreme leftward position by the drive mechanism 36, the drive mechanism 46 moves the gear gripping members 41 to the right into their gear gripping positions. The slide 31 is then driven to its extreme right-hand position with the members 41 maintained in gear gripping position by the drive mechanism 46.

When the slide 31 reaches its extreme right-hand position, the drive mechanism 46 retracts the gear gripping members 41 to release the gears 20. The gears may thereby remain in the positions to which they were last advanced while the slide 31 and the retracted gear gripping members 41 return to the left. Successive gears 20 are thereby advanced to successive stations during each right-hand movement of the slide 31 and remain at such stations during the return or leftward movement of the slide 31. Since the control apparatus for accomplishing the desired sequence of operations of the slide 31 and the associated gripping members may be of conventional form and does not of itself constitute a feature of the present invention, it is not shown in the drawings or further described herein.

The leftwardmost jaws 45 of the gear gripping members 41 serve to advance each successive gear 20 from the magazine 22 to the first work station A. From the time that the leftwardmost jaws 45 leave their gear receiving position under the magazine 22 to advance a gear to Station A, to the time that these jaws return to their gear receiving position, the lowermost gear 20 within the magazine 22 is supported by recessed portions of the gripping members 41 forming shelves 41a. These shelves extend toward each other to the extent that they lie under the lowermost gear in the magazine 22 even when the members 41 are in separated or gear releasing position. The plane of the shelves 41a is at a distance above the platform 25 slightly less than the thickness of a single gear 20 in order that an effective escapement mechanism is provided.

At Station C of the machine it is intended that a pin 50 be inserted in an aperture 20a or 20b in the gear 20. In order that this may be accomplished it is necessary that the aperture be brought directly beneath pin inserting apparatus described below. This, in turn, requires both positioning and angular orienting of the gear, the former being accomplished by the conveyor means 31, 41 as described above.

The pin inserting apparatus at Station C is arranged at such a distance from the center of a gear in position C that the aperture 20a or 20b may be brought directly under the pin inserting apparatus by angular orientation of the gear. It remains necessary to orient the gear angularly such that one of the apertures is brought into the desired position.

The gears 20 are so manufactured that the apertures are at a predetermined orientation with respect to a central rectangular opening 51. Accordingly, the angular orientation of the gear and of the aperture may be determined in terms of the orientation of the rectangulatr opening 51, this being accomplished at Station A. Orientation of the gear in terms of orientation of the rectangular opening 51 creates the problem that the gear may in fact be oriented to either of two angular positions which are 180° apart.

Figure 1:
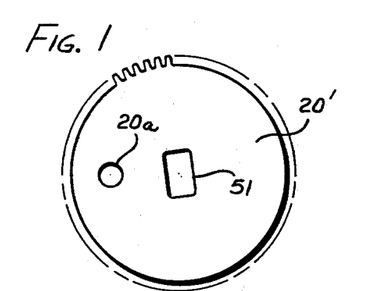
FIG. 1 is a plan view of a gear which the method and apparatus of the present invention are well adapted to handle, the gear being shown in angular orientation which is arbitrarily considered as the desired angular orientation for the performance of an operation thereon.
Figure 2:
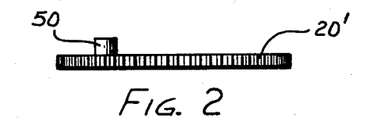
FIG. 2 is an edge view of the gear of FIG. 1, with a pin shown received in an opening therein.
Figure 3:
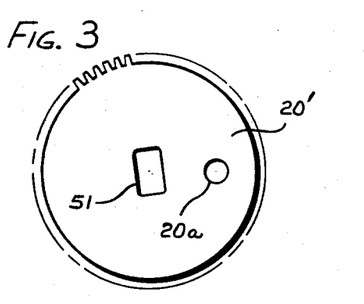
FIG. 3 is a view similar to FIG. 1 but illustrating the gear turned 180° from the desired angular orientation.

More particularly, the aperture 20a may be brought to the position illustrated in FIG. 1 (the position which is arbitrarily treated herein as the desired position) or to the position illustrated in FIG. 3. This follows from the fact that the opening 51, being rectangular, is symmetrical about two axes in the plane of the gear. For this reason, a second orienting Station B is provided, at which station the location of an aperture 20a or 20b is detected, and the gear is alternatively rotated through an angle of 180° or allowed to remain in its existing orientation. It will be noted that Station B could be eliminated if it were acceptable to provide third and fourth apertures spaced 180° from the apertures 20a and 20b, since one of the apertures would then always be present at the desired position following the first angular orientation at Station A. It is preferred, however, for various reasons, that the number of apertures be minimized. Accordingly, the second orientation station at position B is provided.

The purpose of providing the two illustrated apertures 20a and 20b is that the gears 20 may be received in the magazine 22 and passed along the platform 25 with either side facing up. More particularly, one side of a gear 20 is not distinguishable from the other side except with regard to the orientation of the aperture or apertures with respect to the rectangular opening 51. Accordingly, there is no characteristic of the gears which will respond to the segregating effect of a vibratory hopper to reject a gear which is "up-side-down."

Figure 4:
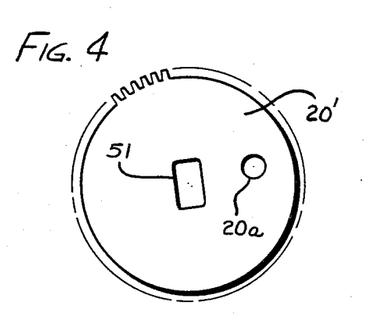
FIG. 4 is a view similar to FIG. 3 but with the gear turned over about one axis of symmetry of the central opening.
Figure 5:
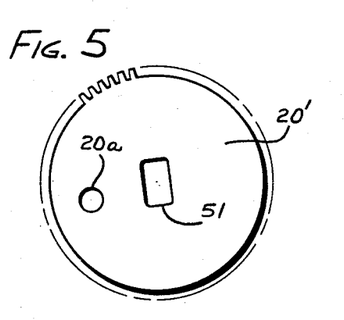
FIG. 5 is a view similar to FIG. 4 but with the gear rotated through an angle of 180°.

By way of further illustration, attention is directed to FIGS. 4 and 5 which illustrate the gear 20' of FIG. 1 (having a single aperture 20a) in reversed or up-side-down position. It will be seen that with this up-side-down gear 20' angularly oriented through use of the rectangular opening 51, the aperture 20a will always be arranged in the wrong position. If the gear 20' is rotated 180° from the position of FIG. 4 to the position of FIG. 5, the aperture 20a is still in the wrong position.

In order to solve this problem without the necessity of turning over or rejecting those gears that are "up-side-down," a second aperture 20b is provided in the manner illustrated in FIGS. 6 and 7. The second opening 20b is so positioned as to be symmetrical with respect to the opening 20a about either one of the two lines of symmetry of the rectangular opening 51. It will be apparent and need not be explained in greater detail that with the two apertures 20a and 20b thus symmetrically disposed about one of the two lines of symmetry of the rectangular opening 51, orientation of the rectangular opening as in FIG. 1 or FIGS. 3–7 will result in one of the two apertures being in either the position of FIG. 1 or the position of FIG. 3. In the latter case, that aperture may be brought to the desired position of FIG. 1 by rotation of the gear through an angle of 180° at Station B. The provision of two apertures 20a and 20b does not eliminate the necessity of the second orienting station of position B, since the gear 20 may be oriented at position A to the orientation illustrated in FIG. 7, whereupon it is necessary to rotate the gear through an angle of 180° at position B to the orientation of FIG. 6 in order to bring the aperture 20a to the desired position illustrated in FIG. 1.

Figure 11:
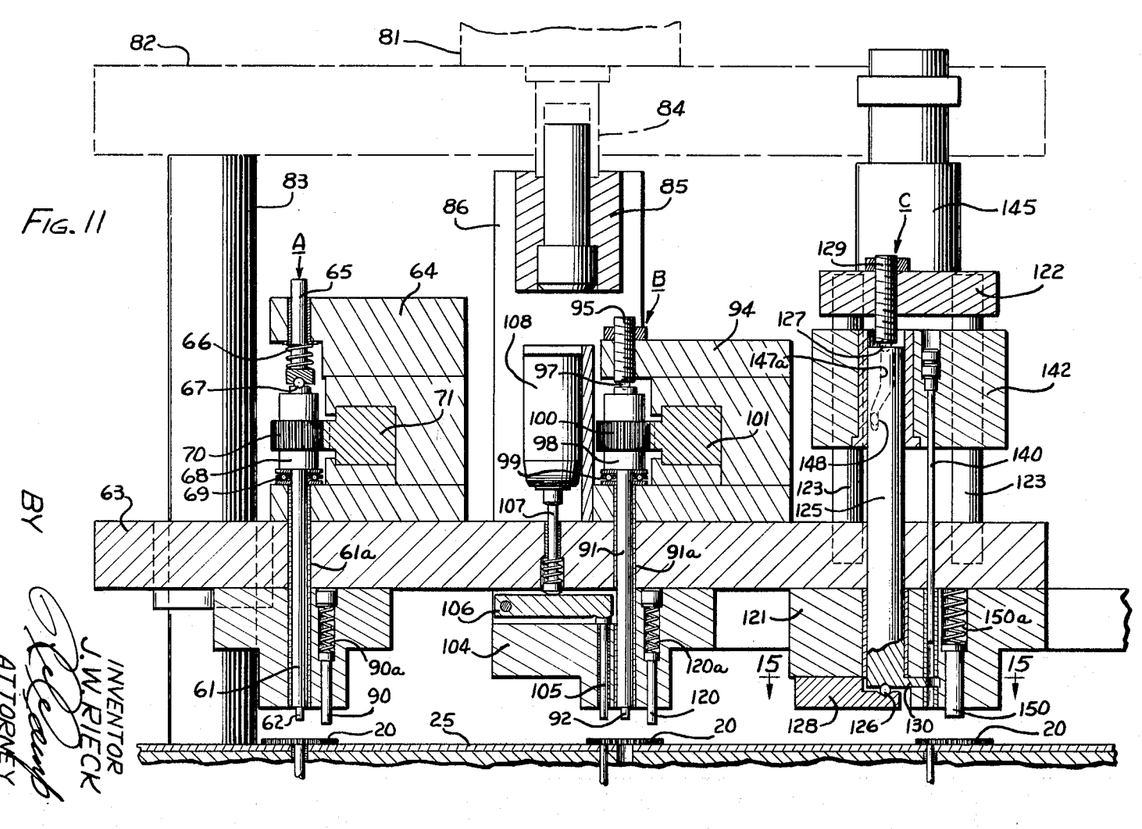
FIG. 11 is an enlarged, partial, cross-sectional view of the upper portion of the machine taken along the line 11—11 of FIG. 9.

As indicated above, apparatus is provided at station A for orienting the successive gears 20 in terms of the orientation of the rectangular opening 51, see FIG. 11. A spindle 61 is provided with a rectangular lower end 62 which is receivable within the rectangular opening 51 in the gears 20. The spindle 61 is rotatably and slidably received within a sleeve 61a which is set in a movable platform 63. An assembly 64 is mounted on the platform 63 and slidably receives a plunger or shaft 65 which is in alignment with the spindle 61. A spring 66 urges the shaft 65 downward, this shaft bearing against the spindle 61 through a single ball bearing 67. Downward movement of the spindle 61 is limited by the engagement of a collar 68, secured to the spindle 61, with ball bearings 69.

A pinion or gear 70 drivingly engages the upper portion of the spindle 61 and meshes with a rack 71. The rack 71 is actuatable by pneumatic drive apparatus 72, seen in part in FIG. 9. The function of the pneumatic drive apparatus 72 and the rack 71 is to rotate the pinion 70 and the spindle 61 through an angle of at least 180° and to terminate rotation of the spindle with the rectangular tip 62 thereof in a predetermined desired angular orientation.

Figure 8:
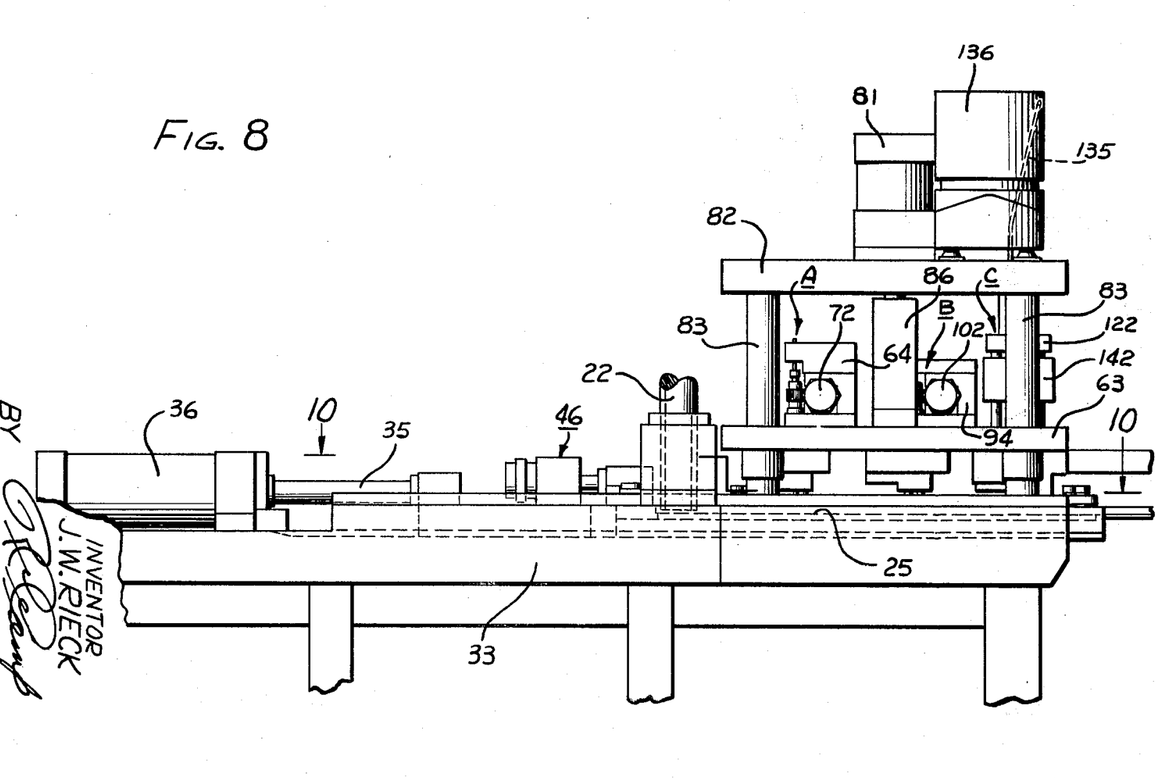
FIG. 8 is an elevational view of a machine constructed in accordance with the present invention.
Figure 9:
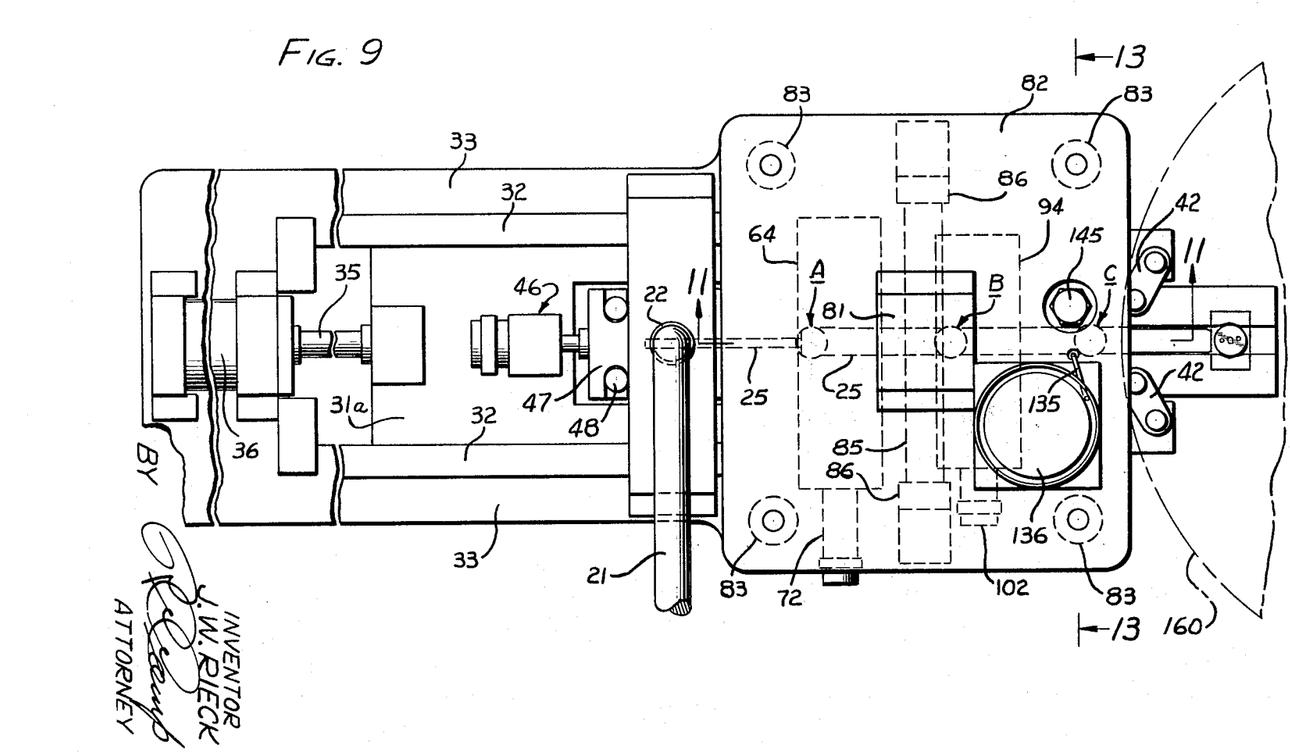
FIG. 9 is a plan view of the machine illustrated in FIG. 8.

The assembly 64 is raised and lowered along with the platform 63 by pneumatic drive apparatus 81 which is mounted on a fixed platform 82. The platform 82 is supported by four posts 83 which also serve as guides for the platform 63, all as best illustrated in FIGS. 8 and 9. The raising and lowering of the movable platform 63 is effected by the pneumatic drive apparatus 81 acting through a plunger 84, a crossbar 85 and hangers 86 connecting the movable platform 63 to the crossbar 85 (see FIGS. 11 and 13).

When the gear 20 has been advanced to Station A by the conveyor apparatus 31, 41, the pneumatic drive apparatus 81 lowers the movable platform 63 such that the rectangular tip 62 of the spindle 61 is brought into engagement with the gear. At this time, the rectangular opening 51 in the gear 20 is oriented at random and presumably prevents entrance of the spindle tip. In this case, the spindle 61 is lifted slightly with respect to the movable platform 63 and the assembly 64, the spring 66 yielding to permit such relative movement.

The pneumatic drive apparatus 72 is then actuated to move the rack 71 and rotate the gear 70 and the spindle 61. After rotation of the spindle through an angle which is necessarily less than 180° the tip of the spindle will reach the same orientation as that of the rectangular opening 51 and will enter the opening under the influence of the spring 66. Continued rotation of the spindle 61 through a total angle of at least 180° necessarily orients the rectangular opening 51 of the gear 20 to the desired orientation illustrated in FIG. 1 and FIGS. 3–7.

By virtue of the fact, however, that the opening 51 is symmetrical about two axes in the plane of the gear, the spindle 61 may enter the opening 51 in either of two angular orientations with respect thereto. Accordingly, the gear 20 may terminate its rotation in either of two angular orientations spaced 180° apart, namely, the two orientations illustrated in FIGS. 6 and 7. The orientation of the gear 20 at either of the two orientations illustrated in FIGS. 6 and 7 may readily be accomplished by positive termination of spindle rotation at a predetermined angular orientation.

Figure 12:
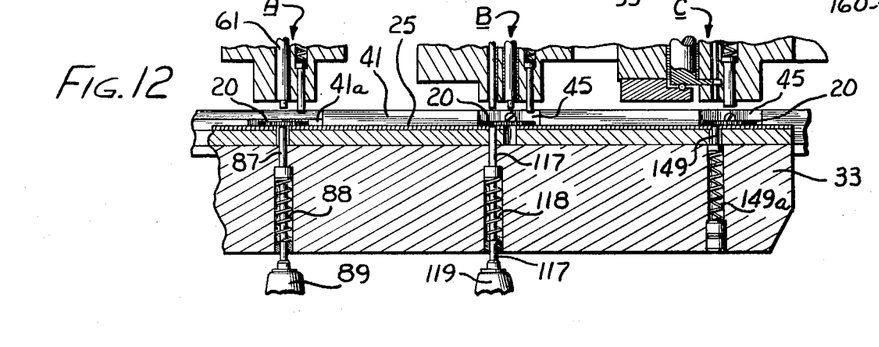
FIG. 12 is a partial, cross-sectional view of the lower portion of the machine taken along the same plane as FIG. 11.

Referring to FIG. 12, it will be seen that a plunger 87 lies within a suitable opening in the platform 25 directly below the spindle 61. The plunger 87 is biased upward by a spring 88 and serves to actuate an electric switch 89, the plunger 87 and the switch 89 serving to prevent machine operation in the event that the orienting operation at Station A is not properly effected. More particularly, if the spindle tip 62 enters the rectangular opening 51 at any time, it bears against the plunger 87 and actuates the switch 89 to permit continued machine operation. If the plunger 61 fails to enter the opening 51 in a gear 20, the switch 89 will not be actuated and the next cycle of operation of the machine will be prevented. Since the circuitry through which the switch 89 may cause interruption of machine operation if not actuated by the spindle 61 is well known to those skilled in the art, and since such circuitry does not of itself constitute a feature of the present invention, it is not shown in the drawings or described in detail herein. For the purpose of disclosing the present invention it is believed that the above explanation of the function of the switch 89 is sufficient.

After completion of the orienting operation at Station A the platform 63 is raised and the rack 71 is returned to its normal position. A pin 90 and a spring 90a, which urges the pin 90 downwardly, are arranged as shown in FIG. 11 to bear resiliently against the upper surface of the gear 20 to eliminate the possibility of the gear clinging to the spindle tip 62 and thereby being improperly lifted from its intended position at Station A.

At Station B there is located another spindle 91 having a rectangular tip 92 receivable within the rectangular opening 51 in the gears 20. As in the case of the spindle 61 at Station A, the spindle 91 is rotatable and slidable within a sleeve 91a which is received in the movable platform 63. An assembly 94 is supported on the movable platform 63 and carries a shaft 95 which is adjustably but rigidly secured thereto. A ball bearing 97 arranged between the coaxial shaft 95 and spindle 91 maintains the spindle downward such that a collar 98 on the spindle bears against ball bearings 99. As opposed to spindle 61 at Station A which may move upward with respect to the platform 63 against the action of the spring 66, the spindle 91 is not vertically movable with respect to the platform 63 although it is rotatable with respect thereto. A pinion or gear 100 is secured to the spindle 91 and engages a rack 101 which is operated by pneumatic drive apparatus 102 shown in part in FIG. 9.

A lower housing 104 which is secured to the movable platform 63 slidably supports a headed pin 105 and pivotally supports a lever 106 whose free end engages the upper, headed end of the pin. Another pin 107 engages the lever 106 and serves to actuate an electric switch 108.

As indicated above, the function of the apparatus at Station B is to rotate the gears 20 delivered thereto through an angle of 180° in the event that such gears are delivered thereto in the orientation illustrated in FIG. 7, and to leave such gears in the same orientation in which they are delivered to Station B in the event that they are oriented as illustrated in FIG. 6. It is the function of the pin 105 to detect and produce an indication of the presence of an aperture 20a or 20b as the gear 20 is delivered to Station B.

In the event that an aperture 20a or 20b is located below the pin 105 when the movable platform 63 descends, the pin 105 will enter such aperture with the result that the lever 106, the pin 107 and the switch 108 all will remain in their normal positions, illustrated in FIG. 11. In the event that no aperture 20a or 20b is located directly beneath the pin 105 (presumably because of the gear 20 being oriented as illustrated in FIG. 7), the pin 105 will strike the surface of the gear 20 before the movable platform 63 reaches its lowermost position and will pivot the lever 106 and cause the pin 107 to actuate the switch 108.

Such actuation of the switch 108 causes energization of the pneumatic driving apparatus 102 and of the rack 101 to rotate the spindle 91 and the gear 20 through an angle of 180°. It should be understood that the spindle 91, and in particular the lower rectangular tip 92 thereof, is caused to terminate its rotation in both directions in the desired orientation of the rectangular opening 51. Accordingly, not only is the gear 20 left in its desired angular orientation after rotation of the spindle 91 with the platform 63 in its lowermost position, but the spindle 91 is properly oriented upon return movement of the rack 101 and reverse rotation of the spindle 91, with the platform 63 in its raised position, such that the lower tip 92 of the spindle 63 is oriented to enter the rectangular opening 51 of the next gear 20 delivered to Station B.

Attention is again directed to the apparatus of FIG. 12. When the pin 105 enters the aperture 20a or 20b, either after rotation of the gear through an angle of 180° at Station B or by virtue of the aperture being oriented directly below the pin 105 as delivered to Station B, the pin 105 depresses a plunger 117 arranged within a suitable opening in the plateform 25 against the action of a spring 118 which biases the plunger 117 upwardly. Such depression of the plunger 117 actuates a switch 119 arranged below the plunger, this being required before the machine is permitted to pass through its next cycle of operation. More particularly, failure of the plunger 117 to actuate the switch 119 prevents operation of the machine through its next cycle. As indicated above in connection with the description of the spindle 61 and the switch 89, the electrical circuitry through which the switches 89 and 119 may control operation of the machine is well known in the art and does not of itself constitute a feature of the present invention. Accordingly, it is not shown in the drawings or described in further detail herein.

A plunger 120 and a spring 120a, which urges the plunger downwardly, are arranged in the lower assembly 104 for depressing the gear 20 and thus assuring that the gear does not cling to and be lifted by either the spindle tip 92 or the pin 105.

After a gear 20 has been finally oriented at Station B, it is advanced to Station C by the conveyor means 31, 41 where a pin 50 is inserted in the aperture 20a or 20b which has been located immediately below the pin inserting apparatus now to be described.

The pin inserting apparatus includes a lower housing 121 which is secured to the lower side of the movable platform 63. Also included in the apparatus is a plate 122 rigidly supported on the movable platform 63 by a pair of rods 123 which extend upwardly from the platform 63. A shaft 125 is rotatably supported by the lower housing 121 through a single ball bearing 126, and by the plate 122 through a single ball bearing 127. As is apparent in FIG. 11, the ball bearing 126 is supported by an arm 128 forming a part of the lower housing 121, and the upper ball bearing 127 is held in position by an adjustable screw 129 threadedly received in the plate 122.

Figure 15:
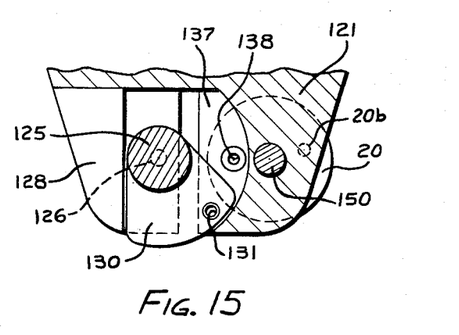
FIG. 15 is a partial, cross-sectional view taken along the line 15—15 of FIG. 11.
Figure 16:
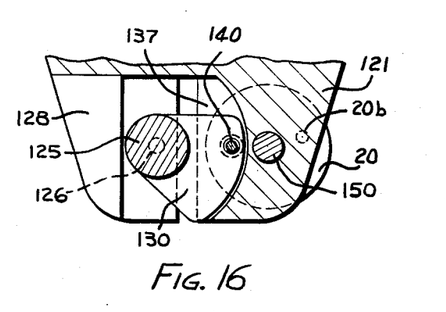
FIG. 16 is a partial, cross-sectional view taken along the line 16—16 of FIG. 14 showing the apparatus of FIG. 15 in a different operating position.

Secured to or integral with the lower end of the shaft 125 is an arm or lobe 130 having an opening 131 therethrough of such size as to receive readily a pin 50, all as best seen in FIGS. 15 and 16. It is intended that the shaft 125 be oscillated such that the opening 131 in the arm 130 may move between a pin supply position, wherein a pin is received in the opening 131, and a pin injection position, wherein a pin is forced into the gear aperture 20a or 20b by a power operated plunger.

The pin supply apparatus is best seen in FIG. 13. It includes a supply tube 135 which is of such diameter as to freely receive pins 50 and to permit gravity flow of pins therethrough. In the illustrated embodiment of the invention, pins are fed to the tube 135 by a vibratory hopper 136 which may be seen in FIGS. 8 and 9. The lower portion of the tube 135 passes partially through the lower housing 121 and terminates immediately above the upper surface of the arm 130. More particularly, it terminates in alignment with the opening 131 of the arm 130 when the latter is in its pin receiving position.

Accordingly, it may be seen that when the shaft 125 and the arm 130 are rotated to the position illustrated in FIG. 15, the opening 131 is arranged immediately below the tube 135 and will receive one pin. The pin thus received in the opening 131 is prevented from passing therethrough by a plate 137 which is arranged immediately below the arm 130. The thickness of the arm 130 is, of course, arranged to be such that a single pin located within the opening 131 and resting on the plate 137 will be flush at its upper end with the upper surface of the arm 130. When the shaft 125 and the arm 130 are rotated to the position illustrated in FIG. 16, the opening 131 and the pin 50 contained therein are aligned with an opening 138 in the plate 137 such that the pin 50 is free to drop against the gear 20 arranged immediately therebelow in Station C.

Preferably, the aperture 20a or 20b, which is arranged directly below the opening 138 for reception of the pin 50, is of such size as to provide a drive fit between the pin and the aperture. Accordingly, means are provided for driving the pin into the gear aperture. These means include a plunger 140 extending through an opening 141 through the lower housing 121, this opening being in alignment with the opening 138. The plunger 140 is freely slidable with respect to the movable platform 63 and the lower housing 121.

The upper end of the plunger 140 is secured within a block 142 which is slidable on the two rods 123 supporting the plate 122 on the movable platform 63. The block 142 is power operated with respect to the platform 63 and the plate 122 by pneumatic drive apparatus 145 mounted on the plate 122, this drive apparatus being connected to the block 142 through a shaft 146 best seen in FIG. 13. The operation of the pneumatic drive apparatus 145 is so governed that it drives the block 142 and the plunger 140 downwardly to seat a pin 50 in the aperture 20a or 20b of a gear 20 after the movable platform 63 has been lowered.

Vertical movement of the block 142 with respect to the movable platform 63 also effects the desired rotation of the shaft 125 and arm 130. The block 142 has a cylindrical passage 147 therethrough for freely receiving the shaft 125 and permitting vertical movement of the block with respect to the shaft. A cam slot 147a in the block 142 opens into the passage 147 and receives a cam roller 148 which is rotatably mounted on the shaft 125.

Figure 14:
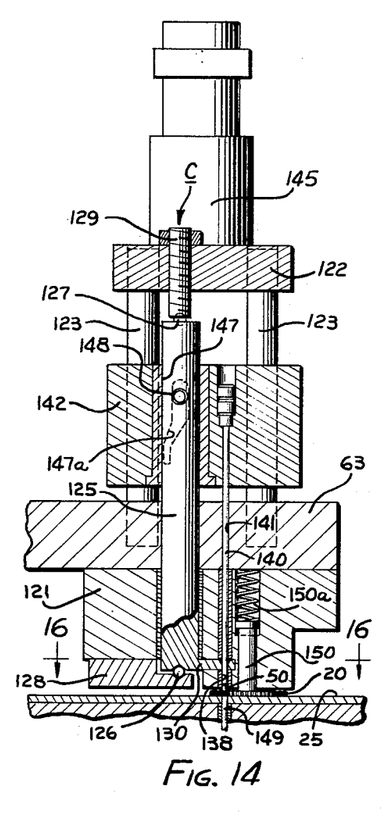
FIG. 14 is a partial, cross-sectional view taken in the same plane as FIG. 11 and showing the right-hand portion of the apparatus of FIG. 11 in a different operating position.

It will be apparent upon reference to FIG. 14 that initial downward movement of the block 142 and of the cam slot 147a will cause counterclockwise rotation of the shaft 125 and of the arm 130 as viewed from the top, the opening 131 in the latter moving from a pin receiving position under the supply tube 135 to the pin dispensing position over the opening 138 and under the plunger 140. During the later portion of the downward stroke of the block 142, a straight portion of the cam slot 147a receives the cam roller 148 whereby rotation of the shaft 125 and of the arm 130 is terminated.

During the initial portion of the downward movement of the block 142 with respect to the movable platform 63, the lower end of the plunger 140 is lowered from the position illustrated in FIG. 11 to a position immediately above the arm 130. During the later portion of the downward movement of the block 142, while the cam roller 148 is in the straight or vertical portion of the cam slot 147a, the plunger 140 passes through the opening 131 in the arm 130 and partially through the opening 138 to drive the pin 50 into the gear aperture.

Upward movement of the block 142 withdraws the plunger 140 from the opening 138 and from the opening 131 in the arm 130 while the cam roller 148 passes relatively through the vertical upper portion of the cam slot 147a. After the lower end of the plunger 140 is withdrawn from the opening 131, the cam roller 148 enters the sloping portion of the cam slot 147a and rotates the shaft 125 such that the opening 131 in the arm 130 is returned to a position immediately below the tube 135 to receive another pin 50.

Arranged immediately below the plunger 140 and the opening 138 is a plunger 149 received within a suitable opening in the platform 25 and biased upwardly by a spring 149a, all as best seen in FIG. 12. The upper end of the spring-biased pin 149 is preferably rounded or cone-shaped and is limited in its upward movement to a position slightly above the upper surface of the platform 25 such that the pin may be depressed by movement of a gear 20 into Station C. When the gear 20 reaches its proper position at Station C, the pin 149 may protrude partially into the gear aperture which is to receive a pin 50, and thereby serve to maintain the gear in proper position and angular orientation.

A plunger 150 is arranged in the lower housing 121 and is urged downwardly by a spring 150a as best seen in FIG. 11. The pin 150, while it is aligned with the central rectangular opening 51 in a properly positioned gear 20, is not intended to enter the opening 51 but merely to bear against the upper surface of the gear 20 at position C to minimize the possibility of gear movement after the conveyor means 31, 41 have released the gear to make a return stroke.

Following the insertion of a pin 50 in one of the apertures 20a and 20b, the gear is next moved by the conveyor apparatus 31, 41 beyond Station C and onto a rotary table 160 seen in FIGS. 9 and 10, and in particular to a station designated D in FIG. 10. With the gear 20 arranged on the rotary table 160, further operations may be performed thereon. Among these may be a staking operation for more securely fastening the pin 50 to the gear 20. Since the rotary table 160 and the operations which may be performed in connection therewith do not constitute a part of the present invention, they are not shown in detail in the drawings or described in further detail herein.

It will be apparent in view of the above description that upon each lowering of the platform 63 operations will be performed at all three Stations A, B and C, this constituting one machine cycle. Operation of the platform 63 and of the conveyor 31, 41 are, of course, synchronized in any suitable manner, such that the conveyor makes its return stroke while operations are being performed at Stations A, B and C, and advances gears to next successive stations while the platform 63 is raised.

It will now be seen that a novel method and apparatus have been disclosed for handling like articles, and in particular for positioning and angularly orienting like articles at a specified point on such article and at a predetermined position in space. In particular, it should be appreciated that the disclosed method and apparatus provide for orientation of like articles whose distinguishing characteristics, with respect to which the desired angular orientation is related, are of such form as to be difficult of detection by conventional sensing and sorting apparatus such as vibratory feeders. It should be noted further that the disclosed method and apparatus solve the problem of properly orienting like articles of sheet-like form even though the articles may be received "up-side-down."

In the illustrated embodiment of the invention the article is oriented through utilization of the central opening 51 in the article. More specifically, the article is oriented such that the central opening is in a prescribed orientation, as by utilization of the generally rectangular spindles 61 and 91. Orientation of the article through use of the opening 51 leaves the article in either of two possible orientations which are spaced apart by an angle of 180°. This follows from the fact that the rectangular opening 51 is symmetrical about two axes in the plane of the article, these being the longitudinal axis of the opening and the transverse axis of the opening.

These axes are perpendicular to each other and are perpendicular to the principal axis of the disc-like gear 20. Because of this symmetry of the opening 51 about two perpendicular axes of the opening, the orienting spindle may enter the opening in either of two relative angular orientations and may therefore leave the article in either of two orientations. The illustrated embodiment of the invention resolves this difficulty in the manner described above. It further resolves the difficulty which attends the fact that the article may be arranged against the platform 25 in either of two arrangements which may be arbitrarily defined as "right-side-up" or "up-side-down."

A novel conveyor means has also been disclosed which is peculiarly adapted to the basic method and apparatus for positioning and orienting like articles. Still further, a novel apparatus has been diclosed for detecting the completion of individual method steps or individual machine operations whereby further machine operation may be prevented in the event of any malfunction of the machine or failure to operate.

While one specific embodiment of the invention has been disclosed, many modifications will be apparent, and it is intended that the invention be interpreted as including all modifications which fall within the true spirit and scope of the invention.

What is claimed is:

1. The method of arranging a disc-like part in a desired angular orientation about its principal axis, in which orientation an aperture in the part lies in a desired direction from its axis, the part having a central, generally rectangular opening therein, which method comprises utilizing a spindle of generally rectangular cross-section and receivable in the opening to rotate the part about its axis to an angular orientation wherein the aperture in the part lies in either of two opposed directions from the axis, one of which directions is the desired direction, detecting the angular orientation of the part, and rotating the part through an angle of 180° in the event the part is detected as not being in the desired angular orientation.

2. The method of arranging a disc-like part in a desired angular orientation about its principal axis, in which orientation an aperture in the part lies in a desired direction from the principal axis, the part having a central, generally rectangular opening therein, and the part being arranged flat against a reference surface with the surface of the part which engages the reference surface being determined by chance, which method comprises providing the part with a second aperture arranged symmetrically with respect to the first aperture about one of the axes of symmetry of the rectangular opening, utilizing a spindle of generally rectangular cross-section and receivable in the opening to rotate the part about its principal axis to an angular orientation wherein one of the apertures in the article lies in either of two opposed directions from the principal axis, one of which directions is the desired direction, detecting the angular orientation of the part, and rotating the part through an angle of 180° in the event the part is detected as not being in the desired angular orientation.

3. The method of arranging an article in a desired angular orientation about a given axis thereof in which orientation a specified point on the article lies in a desired direction from the given axis, the article having a generally rectangular opening therein centered about the given axis, which method comprises utilizing a spindle of generally rectangular cross-section and receivable in the opening to rotate the article about the given axis to an angular orientation wherein the specified point on the article lies in either of two opposed directions from the given axis, one of which directions is the desired direction, detecting the angular orientation of the article, and rotating the article through an angle of 180° in the event that article is detected as not being in the desired angular orientation.

4. The method of arranging an article in a desired angular orientation about a given axis thereof wherein a specified point on the article lies in a desired direction from the given axis, the article having an opening therein symmetrical about two intersecting axes perpendicular to each other and to the given axis whereby orientation of the article about the given axis through utilization of the opening may leave the article in either of two opposite orientations, which method comprises utilizing a spindle drivingly receivable within the opening only in two relative angular orientations spaced 180° apart to rotate the article about the given axis to an angular orientation wherein the specified point on the article lies in either of two opposed directions from the given axis, one of which directions is the desired direction, detecting the angular orientation of the article, and rotating the article through an angle of 180° in the event that the article is detected as not being in the desired angular orientation.

5. Apparatus for orienting a disc-like article, having a generally rectangular central opening therein to an orientation wherein an aperture in the article at a predetermined position on the article with respect to the central opening lies in a desired direction from the central opening, said apparatus comprising conveyor means for intermittently advancing a succession of the articles simultaneously to respective ones of successive stations, said conveyor means comprising a platform along which the articles may be advanced, drive means reciprocable with respect to said platform generally parallel to the direction of desired article movement along said platform, a pair of members cooperable to grip a plurality of articles in aligned array, parallel linkage means connecting each of said members to said drive means, said linkage maintaining article engaging surfaces of said members in generally parallel relationship and permitting relative movement of said members toward each other to article gripping positions and away from each other to article releasing positions, and means for moving said members into said article gripping positions substantially at one end of each stroke of said reciprocating drive means and for moving said members into article releasing positions substantially at the other end of each stroke of said drive means; and means for rotating the articles at two of the stations to orient the aperture to the predetermined position with respect to the central opening, said last-mentioned means comprising a rotatable spindle at the first of said two stations having a tip receivable within the central opening only in two relative angular orientations spaced 180° apart, means for rotating said spindle, means for stopping rotation of said spindle with the spindle in a predetermined orientation wherein the aperture is in either of two positions spaced 180° apart, one of which is the predetermined position with respect to the central opening, a second spindle at the second of said two stations having a tip receivable within the central opening only in two relative angular orientations spaced 180° apart, means for rotating said spindle, means for stopping rotation of said spindle after rotation of said article through an angle of 180°, means for detecting the angular orientation of the article as delivered to the second station, and means responsive to said detecting means for causing rotation of the article by said second spindle only when the article is detected as not being in the desired orientation as delivered to the second station.

6. Apparatus for orienting a disc-like article, having a generally rectangular central opening therein to an orientation wherein an aperture in the article at a predetermined position on the article with respect to the central opening lies in a desired direction from the central opening, said apparatus comprising conveyor means for intermittently advancing a succession of the articles simultaneously to respective ones of successive stations, and means for rotating the articles at two of the stations to orient the aperture to the predetermined position with respect to the central opening, said last-mentioned means comprising a rotatable spindle at the first of said two stations having a tip receivable within the central opening only in two relative angular orientations spaced 180° apart, means for rotating said spindle, means for stopping rotation of said spindle with the spindle in a predetermined orientation wherein the aperture is in either of two positions spaced 180° apart, one of which is the predetermined position with respect to the central opening, a second spindle at the second of said two stations having a tip receivable within the central opening only in two relative angular orientations spaced 180° apart, means for rotating said spindle, means for stopping rotation of said spindle after rotation of said article through an angle of 180°, means for detecting the angular orientation of the article as delivered to the second station, and means responsive to said detecting means for causing rotation of the article by said second spindle only when the article is detected as not being in the desired orientation as delivered to the second station.

7. Apparatus for orienting an article about a given axis, the article having a central opening therethrough which is effectively symmetrical about two intersecting axes perpendicular to each other and to the given axis, to an orientation wherein an aperture in the article is located at a predetermined position with respect to the given axis, said apparatus comprising conveyor means for intermittently advancing a succession of said articles simultaneously to respective ones of successive stations, and means for rotating the articles at two of the stations to orient the aperture to the predetermined position with respect to the given axis, said last-mentioned means comprising a rotatable spindle at the first of said two stations having a tip receivable within the central opening only in two relative angular orientations spaced 180° apart, means for rotating said spindle, means for stopping rotation of said spindle with the spindle in a predetermined orientation wherein the aperture is in either of two positions spaced 180° apart, one of which is the predetermined position with respect to the central opening, a second spindle at the second of said two stations having a tip receivable within the central opening only in two relative angular orientations spaced 180° apart, means for rotating said spindle, means for stopping rotation of said spindle after rotation of said article through an angle of 180°, means for detecting the angular orientation of the article as delivered to the second station, and means responsive to said detecting means for causing said rotation of the article by said second spindle only when the article is detected as not being in the desired orientation as delivered to the second station.

References Cited in the file of this patent

UNITED STATES PATENTS

| | | |
|---|---|---|
| 1,426,039 | Candee | Aug. 15, 1922 |
| 1,577,627 | Webster | Mar. 23, 1926 |
| 2,609,912 | Engel | Sept. 9, 1952 |
| 2,968,387 | Lagler | Jan. 17, 1961 |
| 3,004,649 | Waltke | Oct. 17, 1961 |

UNITED STATES PATENT OFFICE
CERTIFICATE OF CORRECTION

Patent No. 3,163,281                      December 29, 1964

John W. Rieck

It is hereby certified that error appears in the above numbered patent requiring correction and that the said Letters Patent should read as corrected below.

Column 9, line 50, after "articles" insert -- such that an operation may be performed on successive articles --; column 10, line 70, after "that" insert -- the --.

Signed and sealed this 22nd day of June 1965.

(SEAL)
Attest:

ERNEST W. SWIDER                      EDWARD J. BRENNER
Attesting Officer                        Commissioner of Patents